United States Patent
Navid (10) Patent No.: US 9,660,847 B2
(45) Date of Patent: May 23, 2017

(54) EQUALIZED MULTI-SIGNALING MODE DRIVER

(71) Applicant: Rambus Inc., Sunnyvale, CA (US)

(72) Inventor: Reza Navid, San Francisco, CA (US)

(73) Assignee: Rambus Inc., Sunnyvale, CA (US)

( * ) Notice: Subject to any disclaimer, the term of this patent is extended or adjusted under 35 U.S.C. 154(b) by 0 days.

(21) Appl. No.: 14/952,016

(22) Filed: Nov. 25, 2015

(65) Prior Publication Data
US 2016/0149730 A1   May 26, 2016

Related U.S. Application Data

(60) Provisional application No. 62/085,113, filed on Nov. 26, 2014.

(51) Int. Cl.
*H03H 7/40* (2006.01)
*H04L 25/49* (2006.01)
*H04L 25/03* (2006.01)

(52) U.S. Cl.
CPC .... *H04L 25/4917* (2013.01); *H04L 25/03343* (2013.01); *H04L 2025/03363* (2013.01)

(58) Field of Classification Search
CPC . H04L 1/0003; H04L 25/028; H04L 25/4902; H04L 25/03038; H04L 25/4917; H04L 25/0272
USPC ....... 375/259, 286, 353, 230, 238–239, 257, 375/232
See application file for complete search history.

(56) References Cited

U.S. PATENT DOCUMENTS

| | | | |
|---|---|---|---|
| 6,982,587 B2 | 1/2006 | Chen et al. | |
| 7,126,378 B2 | 10/2006 | Stojanovic et al. | |
| 7,308,058 B2 * | 12/2007 | Zerbe | H04L 1/0003 375/259 |
| 7,919,984 B2 * | 4/2011 | Balamurugan | H03K 19/01858 326/68 |
| 8,183,887 B2 * | 5/2012 | Stojanovic | H04L 25/028 326/21 |
| 8,275,027 B2 | 9/2012 | Abbasfar et al. | |
| 8,330,503 B2 | 12/2012 | Chen et al. | |
| 8,352,696 B2 | 1/2013 | Hampel | |
| 8,594,262 B2 | 11/2013 | Slezak et al. | |
| 8,761,235 B2 | 6/2014 | Dally | |
| 9,237,045 B2 * | 1/2016 | Kizer | H04L 25/06 |
| 2002/0075968 A1 * | 6/2002 | Zerbe | G11C 7/1051 375/286 |
| 2005/0134307 A1 * | 6/2005 | Stojanovic | H04L 25/028 326/31 |
| 2015/0256363 A1 * | 9/2015 | Shvydun | H04L 25/03057 375/233 |

* cited by examiner

*Primary Examiner* — Khanh C Tran
(74) *Attorney, Agent, or Firm* — The Neudeck Law Firm, LLC (57) ABSTRACT

A transmit circuit can be configured to output two-level pulse amplitude modulation (PAM-2) or four-level pulse amplitude modulation (PAM-4). In the PAM-2 mode, pre-tap feed-forward equalization (FFE) and post-tap FFE can be applied to the PAM-2 signal by pre-taps and post-taps, respectively. In the PAM-4 mode, at least one post-tap is repurposed to generate, along with the main tap, the main PAM-4 signaling levels. At least one PAM-2 FFE tap is repurposed to apply FFE in the PAM-4 mode.

20 Claims, 11 Drawing Sheets

FIGURE 10 ized multi-signaling mode driver in two-level pulse amplitude modulation (PAM-2) mode.

EQUALIZED MULTI-SIGNALING MODE DRIVER

DETAILED DESCRIPTION OF THE EMBODIMENTS

A driver can be configured to use two-level pulse amplitude modulation (PAM-2) or four-level pulse amplitude modulation (PAM-4). In the PAM-2 mode, feed-forward equalization (FFE) can be applied to the PAM-2 signal by pre-taps and post-taps, respectively. In the PAM-4 mode, at least one FFE tap is repurposed to generate, along with the main tap, the main PAM-4 signaling levels. In an embodiment, at least one PAM-2 tap can be repurposed to apply FFE in the PAM-4 mode. In another embodiment, no PAM-2 taps are repurposed to apply FFE in the PAM-4 mode.

Figure 1:
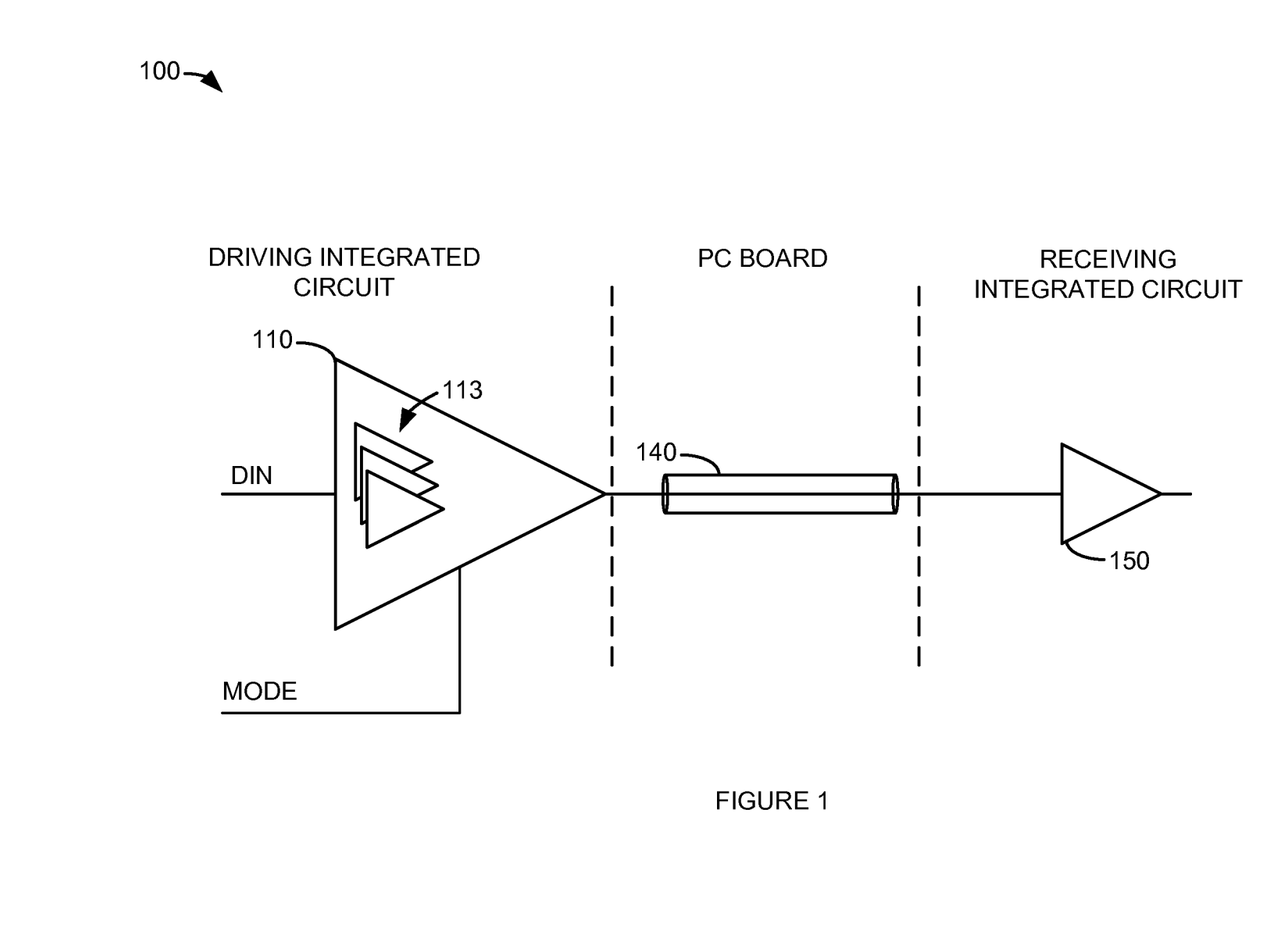
FIG. 1 a block diagram illustrating an embodiment of a multi-mode signaling system.

FIG. 1 shows a block diagram illustrating an embodiment of a multi-mode signaling system. Signaling system 100 comprises a driving integrated circuit, a receiving integrated circuit, and interconnect between them. The driving integrated circuit includes transmitter circuit 110 (a.k.a., a driver). Transmitter circuit 110 uses finite impulse response (FIR) based equalization. Transmitter circuit 110 includes tap drivers 113. Tap drivers 113 may include a pre-tap FFE driver, a post-tap FFE driver, and a main tap driver.

The receiver integrated circuit includes receiver circuit 150. The interconnect between the driving integrated circuit and the receiving integrated circuit comprises interconnect system 140. Interconnect system 140 would typically comprise a printed circuit (PC) board, connector, cable, flex circuit, other substrate, and/or a combination of these. Interconnect system 140 may be and/or include one or more transmission lines.

Receiver circuit 150 would typically be part of an integrated circuit that is receiving the signal sent by the driving integrated circuit. It should be understood that termination (not shown in FIG. 1) can be part of the integrated circuit or interconnect system 140. It should also be understood that although system 100 is illustrated as transmitting a single-ended signal, the signals sent by the driving integrated circuit of system 100 may represent one of a pair of differential signals or one of a collection of signals sending multi-wire-coded data.

In FIG. 1, the output of transmitter circuit 110 is connected to a first end of interconnect system 140. The second end of interconnect system 140 is connected to the input of receiver 150. Transmitter circuit 110 can be configured to drive either PAM-2 or PAM-4 signaling levels. In PAM-2 mode, transmitter circuit 110 can use tap drivers 113 to apply pre-tap FFE, post-tap FFE and drive the main (two-level) signal. In PAM-4 mode, transmitter circuit 110 can use tap drivers 113 to apply pre-tap FFE, post-tap FFE and drive the main (four-level) signal. Transmitter circuit 110 may repurpose at least one tap driver 113 to generate, along with the main tap, the main (four-level) signal rather than applying FFE. In an embodiment, a tap driver 113 that is used to apply post-tap FFE in PAM-2 mode is repurposed to generate, along with the main tap, the main (four-level) signal in PAM-4 mode.

In an embodiment, a tap driver 113 that is used to apply pre-tap FFE in PAM-2 mode may be repurposed to apply post-tap FFE to the main (four-level) signal in PAM-4 mode. The application of this post-tap FFE to the main (four-level) signal in PAM-4 mode by this repurposed tap driver 113 can be in addition to the repurposing of a tap driver 113 to help generate the main (four-level) signal in PAM-4 mode.

Figure 2:
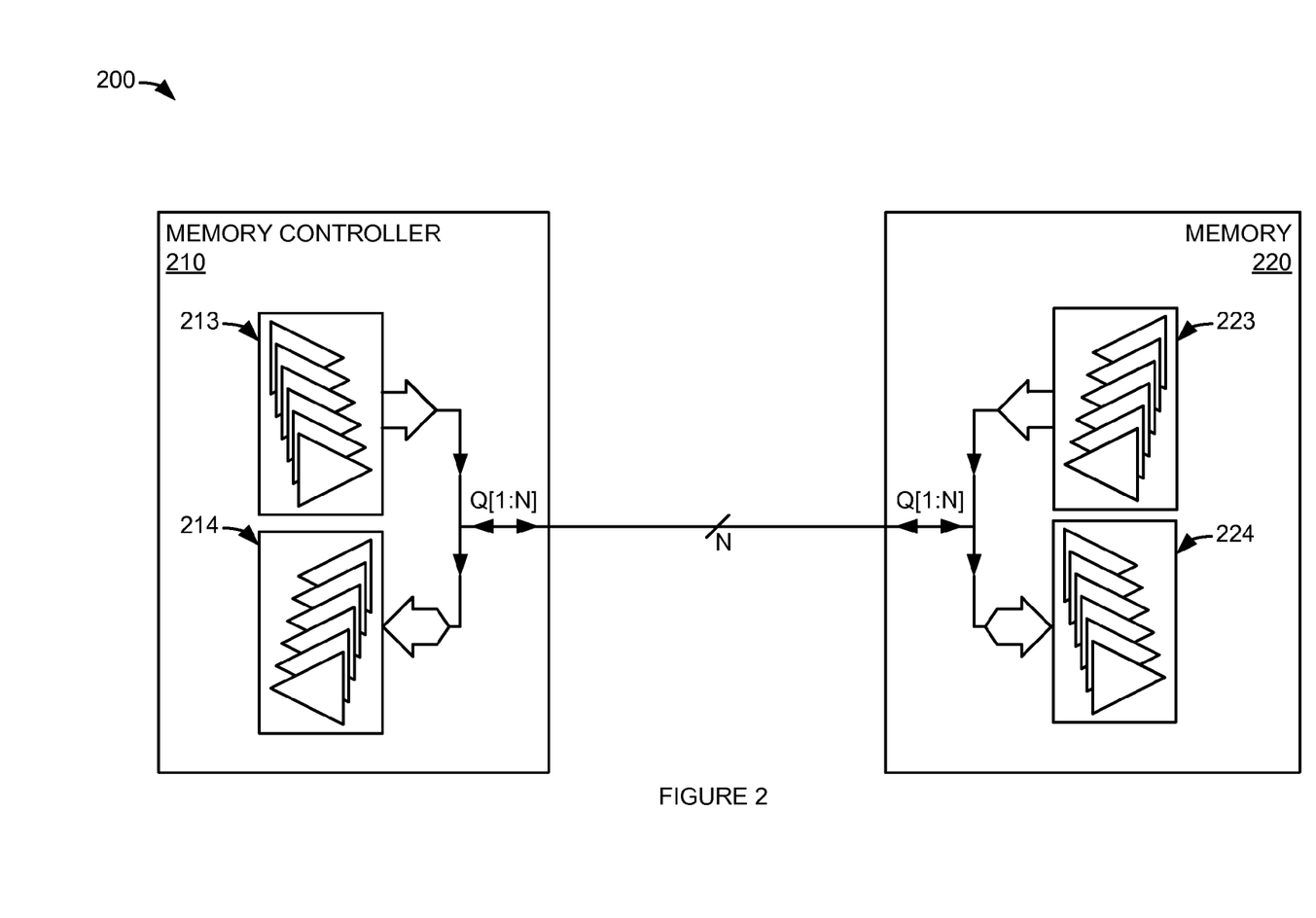
FIG. 2 is a block diagram illustrating a memory system.

FIG. 2 is a block diagram illustrating a memory system. In FIG. 2, memory system 200 comprises memory controller 210 and memory 220. Memory controller 210 includes drivers 213 and receivers 214. Memory controller 210 also includes N number of signal ports Q[1:N] that may be driven by one or more of drivers 213 and may receive signals to be sampled by one or more of receivers 214. Memory 220 includes drivers 223 and receivers 224. Memory 220 also includes N number of signal ports Q[1:N] that may be driven by one or more of drivers 223 and may receive signals to be sampled by one or more of receivers 224. Signal ports Q[1:N] of memory controller 210 are operatively coupled to ports Q[1:N] of memory 220, respectively. Receivers 224 of memory 220 may receive one or more of the Q[1:N] signals from memory controller 210. Receivers 214 of memory controller 210 may receive one or more of the Q[1:N] signals from memory 220.

One or more of drivers 213 when configured and coupled with a corresponding one or more receivers 224 may form a PAM-2 signaling system or a PAM-4 signaling system. Thus, one or more of drivers 213 of memory controller 210 may correspond to transmitter circuit 110, discussed previously, or correspond to a transmitter circuit discussed herein subsequently. In these cases, the one or more of drivers 213 of memory controller 210 may, in PAM-2 mode, use its tap drivers to apply pre-tap FFE, post-tap FFE, and drive the main (two-level) signal. In PAM-4 mode, the one or more of drivers 213 may use its tap drivers to apply pre-tap FFE, post-tap FFE, and drive the main (four-level) signal. Drivers 213 may repurpose at least one of its tap drivers to generate, along with the main tap, the main (four-level) signal rather than applying FFE. In an embodiment, a tap driver that is used to apply post-tap FFE in PAM-2 mode is repurposed by a driver 213 to generate, along with the main tap, the main (four-level) signal in PAM-4 mode. A tap driver of a driver 213 that is used to apply pre-tap FFE in PAM-2 mode may be repurposed to apply post-tap FFE to the main (four-level) signal in PAM-4 mode. The application of this post-tap FFE to the main (four-level) signal in PAM-4 mode by this repurposed tap driver can be in addition to the repurposing of a tap driver to generate the main (four-level) signal in PAM-4 mode.

Likewise, one or more of drivers 223 when coupled with a corresponding one or more receivers 214 may form a PAM-2 signaling system or a PAM-4 signaling system. Thus, one or more of drivers 223 of memory 220 may correspond to transmitter circuit 110, discussed previously, or correspond to a transmitter circuit discussed herein subsequently. In these cases, the one or more of drivers 223 of memory 220 may, in PAM-2 mode, use its tap drivers to apply pre-tap FFE, post-tap FFE, and drive the main (two-level) signal. In PAM-4 mode, the one or more of drivers 223 may use its tap drivers to apply pre-tap FFE, post-tap FFE, and drive the main (four-level) signal. Drivers 223 may repurpose at least one of its tap drivers to generate, along with the main tap, the main (four-level) signal rather than applying FFE. In an embodiment, a tap driver that is used to apply post-tap FFE in PAM-2 mode is repurposed by a driver 223 to generate, along with the main tap, the main (four-level) signal in PAM-4 mode. A tap driver of a driver 223 that is used to apply pre-tap FFE in PAM-2 mode may be repurposed to apply post-tap FFE to the main (four-level) signal in PAM-4 mode. The application of this post-tap FFE to the main (four-level) signal in PAM-4 mode by this repurposed tap driver can be in addition to the repurposing of a tap driver to help generate the main (four-level) signal in PAM-4 mode.

Memory controller 210 and memory 220 are integrated circuit type devices, such as one commonly referred to as a "chip". A memory controller, such as memory controller 210, manages the flow of data going to and from memory devices, such as memory 220. For example, a memory controller may be a northbridge chip, an application specific integrated circuit (ASIC) device, a graphics processor unit (GPU), a system-on-chip (SoC) or an integrated circuit device that includes many circuit blocks such as ones selected from graphics cores, processor cores, and MPEG encoder/decoders, etc. Memory 220 can include a dynamic random access memory (DRAM) core or other type of memory cores, for example, static random access memory (SRAM) cores, or non-volatile memory cores such as flash. In addition, although the embodiments presented herein describe memory controller and components, the instant apparatus and methods may also apply to chip interfaces that effectuate signaling between separate integrated circuit devices.

It should be understood that signal ports Q[1:N] of both memory controller 210 and memory 220 may correspond to any input or output pins (or balls) of memory controller 210 or memory 220 that transmit information between memory controller 210 and memory 220. For example, signal ports Q[1:N] can correspond to bidirectional data pins (or pad means) used to communicate read and write data between memory controller 210 and memory 220. The data pins may also be referred to as "DQ" pins. Thus, for a memory 220 that reads and writes data up to 16 bits at a time, signal ports Q[1:N] can be seen as corresponding to pins DQ[0:15]. In another example, signal ports Q[1:N] can correspond to one or more unidirectional command/address (C/A) bus. Signal ports Q[1:N] can correspond to one or more unidirectional control pins. Thus, signal ports Q[1:N] on memory controller 210 and memory 220 may correspond to pins such as CS (chip select), a command interface that includes timing control strobes such as RAS and CAS, address pins A[0:P] (i.e., address pins carrying address bits), DQ[0:X] (i.e., data pins carrying data bits), etc., and other pins in past, present, or future devices.

Figure 3A:
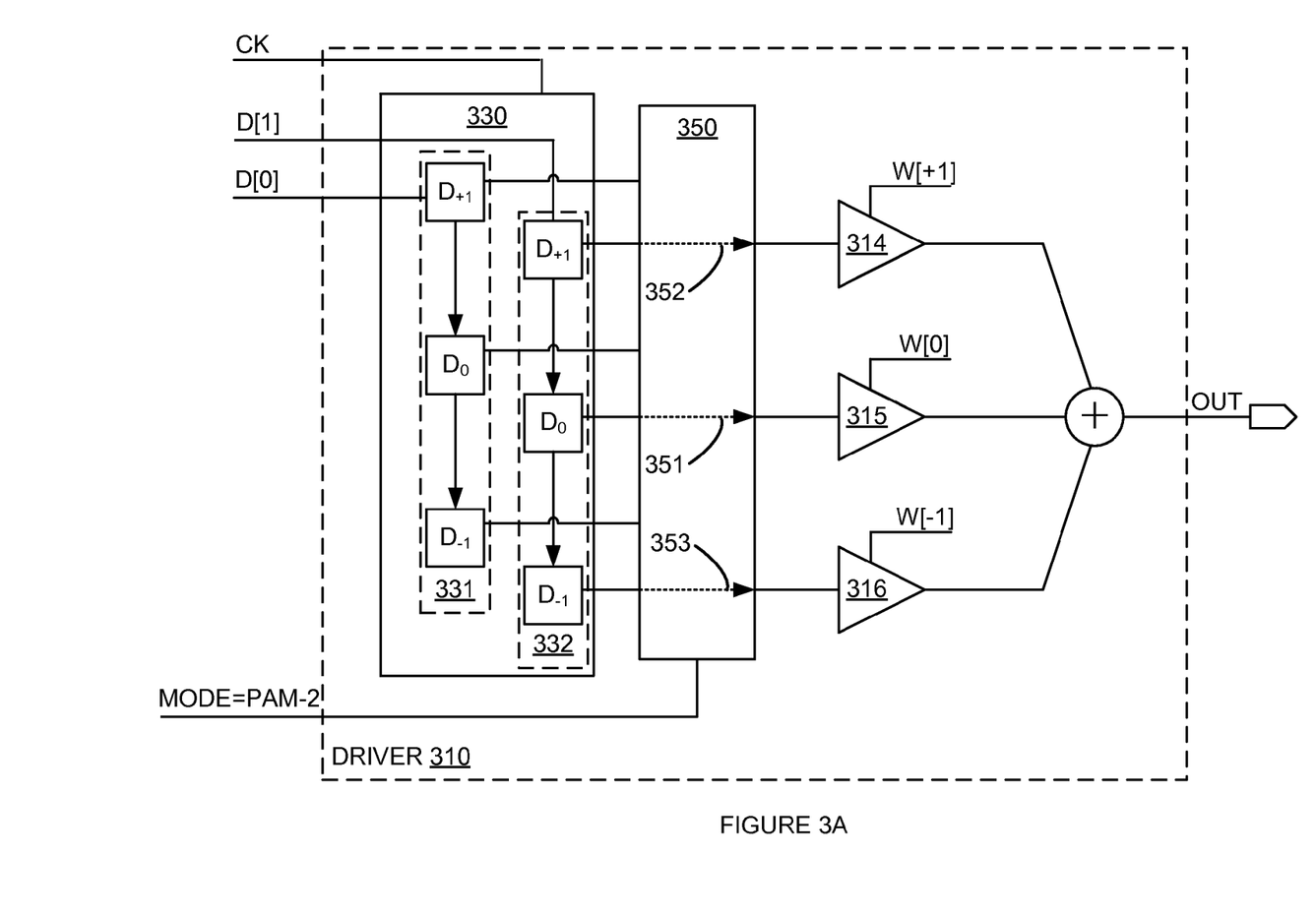
FIG. 3A illustrates an equalized multi-signaling mode driver in two-level pulse amplitude modulation (PAM-2) mode.

FIG. 3A illustrates an equalized multi-signaling mode driver in two-level pulse amplitude modulation (PAM-2) mode. In FIG. 3A driver 310, comprises FIR logic 330, mode logic 350, tap driver 314, tap driver 315, and tap driver 316. FIR logic 330 includes shift register 331 and shift register 332. In the particular embodiment shown in FIGS. 3A and 3B, shift register 331 and shift register 332 are three elements deep. Shift register 331 receives a data value D[0] that is to be transmitted in PAM-4 mode. Shift register 332 receives a data value D[1] to be transmitted by driver 310 in both the PAM-2 and the PAM-4 modes. In PAM-4 mode, D[1] is the most significant bit and D[0] is the least significant bit of the two-bit value transmitted by driver 310. In PAM-2 mode, D[1] is the one-bit value transmitted by driver 310. Mode logic 350 receives an indicator that configures driver 310 to either drive PAM-2 signals or to drive PAM-4 signals. Driver 310 (and FIR logic 330, in particular) receives at least one timing reference, CK, to indicate and/or control the timing signals internal to, received by, and/or output by, driver 310.

Figure 3B:
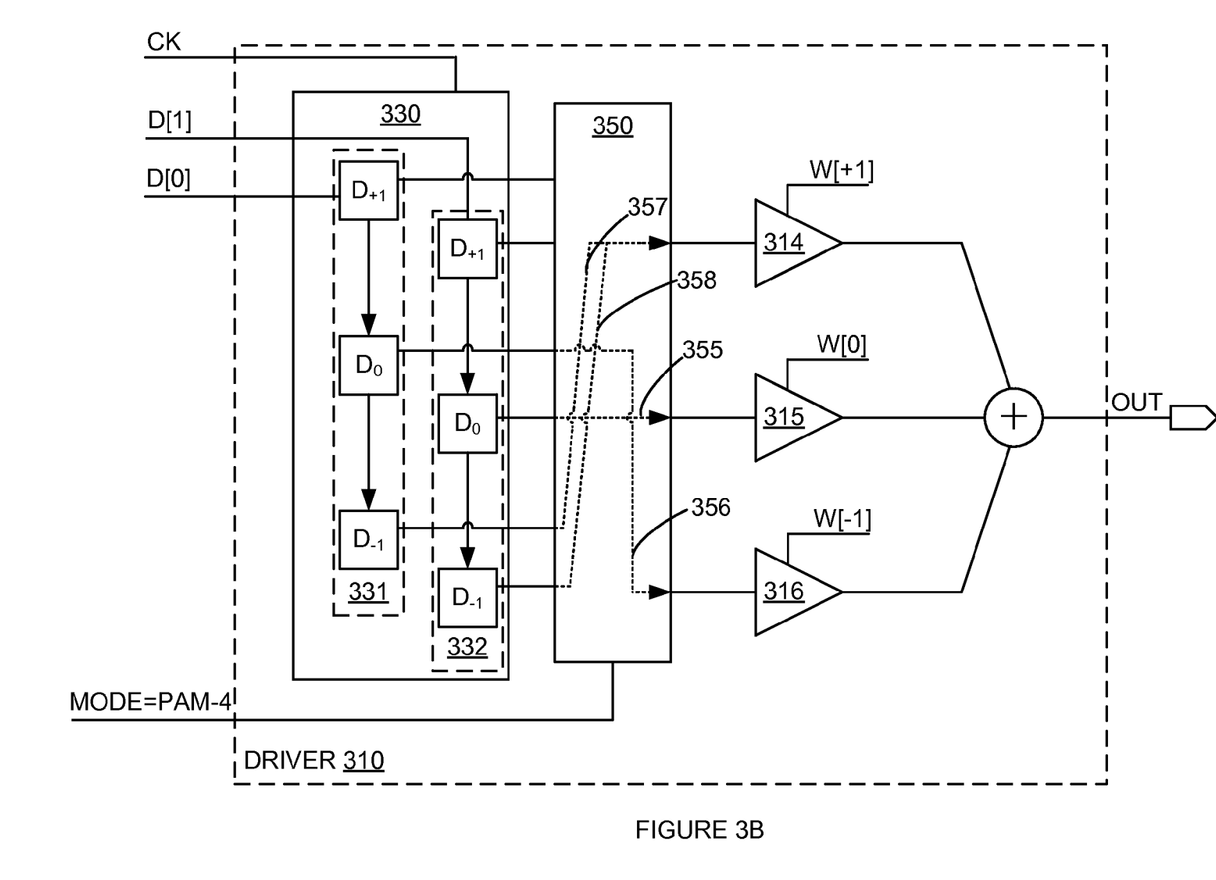
FIG. 3B illustrates an equalized multi-signaling mode driver in four-level pulse amplitude modulation (PAM-4) mode.

Tap drivers 314-316 are each operatively coupled to mode logic 350. Tap drivers 314-316 are each operatively coupled to mode logic 350 in order to receive values to drive, and to receive tap drive output timing. The outputs of tap drivers 314-316 are added together to produce the signal at the output node of driver 310 (OUT). In an embodiment using current mode type tap drivers 314-316 (e.g., open-drain), the outputs of tap drivers 314-316 may be connected together in order to add the outputs of tap drivers 314-316 and produce the signal at the output node of driver 310.

In an embodiment, tap drivers 314-316 each receive drive strength values—referred to herein as tap weights. Tap driver 314 receives tap weight W[+1]. Tap driver 315 receives tap weight W[0]. Tap driver 314 receives tap weight W[−1]. Each tap weight is supplied to a respective tap driver 314-316 to control the level of the output signal generated by the respective tap driver 314-316.

In PAM-2 mode and PAM-4 mode, shift register 332 is used to store a pre-tap data value $D_{+1}$, a primary data value $D_0$, and a post-tap data value $D_{-1}$. In PAM-2 mode, the primary data value of shift register 332 is the data value to be transmitted during a given transmit interval. In PAM-4 mode, the primary data value is the most significant bit of the two-bit data value to be transmitted during a given transmit interval. The pre- and post-tap data values are the next-to-be transmitted and previously transmitted, respectively. In other words, the subscript of the "D" elements of shift register 332 indicates the number of transmit intervals that are to transpire before the data value stored in that element will be transmitted. In PAM-2 mode, data value D[0], and therefore shift register 331, is not used.

In PAM-4 mode, shift register 331 is used to store a pre-tap data value $D_{+1}$, a primary data value $D_0$, and a post-tap data value $D_{-1}$. The primary data value of shift register 331 is the least significant bit of the two-bit data value to be transmitted during a given transmit interval. The pre- and post-tap data values are the next-to-be transmitted and previously transmitted, respectively. In other words, the subscript of the "D" elements of shift register 331 indicates the number of transmit intervals that are to transpire before the data value stored in that element will be transmitted.

In FIG. 3A, mode logic 350 configures driver 310 to drive PAM-2 signal levels. Thus, as illustrated by arrow 352, the pre-tap data value $D_{+1}$ of shift register 332 is operatively coupled to, by mode logic 350, the input of tap driver 314. As illustrated by arrow 351, the primary data value $D_0$ of shift register 332 is operatively coupled, by mode logic 350, to the input of tap driver 315. And, as illustrated by arrow 353, the post-tap data value $D_{-1}$ of shift register 332 is operatively coupled, by mode logic 350, to the input of tap driver 316. Accordingly, in PAM-2 mode, tap driver 314 functions as a pre-tap driver (i.e. applies pre-tap FFE); tap driver 315 functions as the primary (or main) tap driver; and, tap driver 316 functions as a post-tap driver (i.e., applies post-tap FFE).

FIG. 3B illustrates an equalized multi-signaling mode driver in four-level pulse amplitude modulation (PAM-4) mode. In FIG. 3B, mode logic 350 configures driver 310 to drive PAM-4 signal levels. As illustrated by arrow 355, the primary data value $D_0$ of shift register 332 is operatively coupled, by mode logic 350, to the input of tap driver 315. As illustrated by arrow 356, the primary data value $D_0$ of shift register 331 is operatively coupled, by mode logic 350, to the input of tap driver 316. As illustrated by arrow 357, the post-tap data value $D_{-1}$ of shift register 331 is operatively coupled, by mode logic 350, to the input of tap driver 314. Likewise, as illustrated by arrow 358, the post-tap data value $D_{-1}$ of shift register 332 is operatively coupled, by mode logic 350, to the input of tap driver 314. Accordingly, in PAM-4 mode, tap driver 314 functions as a post-tap driver (i.e., applies post-tap FFE); tap driver 315 functions as the primary (or main) tap driver for the most significant bit of the two-bit value being driven; and, tap driver 316 functions as the primary (or main) tap driver for the least significant bit of the two-bit value being driven.

In an embodiment, the tap weights W[+1], W[0], and W[−1] used in PAM-4 mode are the same tap weights used in PAM-2 mode. In another embodiment, tap weights W[0] applied to tap driver 315 and tap weight W[−1] applied to tap driver 316 may be set to provide the appropriate drive strengths to implement PAM-4 signaling levels and re-set to implement PAM-2 signaling levels, as appropriate. For example, to implement PAM-4 signaling levels, tap weight W[−1] may be set to approximately 50% of tap weight W[0] (e.g., if W[0]=2.0, then W[−1]=1.0.) This would provide relative signaling levels of: $-3\alpha$, $-\alpha$, $+\alpha$, and $+3\alpha$ for D[1:0] values of 00, 01, 10, and 11, respectively (where a is an arbitrary constant that determines the magnitude of the PAM-4 signal).

In an embodiment, mode logic 350 also combines the post-tap values from $D_{-1}$ of shift register 331 and $D_{-1}$ of shift register 332 (as illustrated by arrows 357 and 358) to produce a one bit equalization value that is input to tap driver 314. Examples of the relative drive strengths (compared to other values in a column) output by tap driver 314 are given in Table 1. It should be understood that the columns labeled "2-bit EQ" and "1½-bit EQ" would require a two bit equalization value to be input to tap driver 314, or an additional tap driver. It should also be understood that the column labeled "1-bit EQ" can be implemented using the post-tap value from $D_{-1}$ of shift register 332 (as shown by arrow 358) without using the using the post-tap value from $D_{-1}$ of shift register 331. In an embodiment (not shown in FIG. 3B), the FFE applied can be pre-tap FFE instead of a post-tap FFE. In this embodiment, mode logic 350 will be configured such that tap driver 314 will receive its inputs from the $D_{+1}$ of shift register 331 and the $D_{+1}$ of shift register 332 (instead of the $D_{-1}$'s.)

TABLE 1

| Previous PAM-4 level | 2-bit EQ (relative strength) | 1-bit EQ (relative strength) | 1½-bit EQ (relative strength) |
|---|---|---|---|
| $3\alpha$ | 3 | 2 | 3 |
| $\alpha$ | 1 | 2 | 0 |
| $-\alpha$ | −1 | −2 | 0 |
| $-3\alpha$ | −3 | −2 | −3 |

Figure 4:
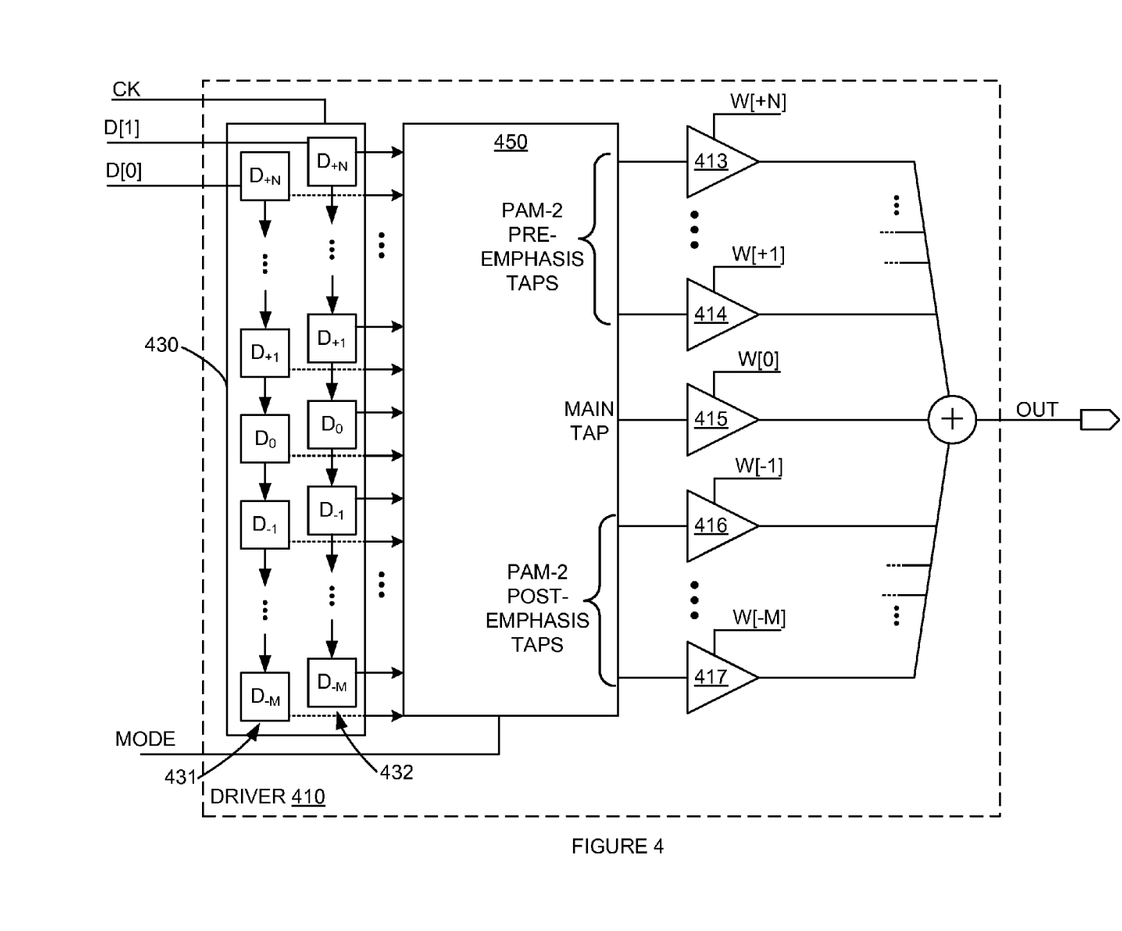
FIG. 4 illustrates a multi-signaling mode driver with arbitrary numbers of pre-tap FFE and post-tap FFE taps.

FIG. 4 illustrates a multi-signaling mode driver with arbitrary numbers of pre-tap FFE and post-tap FFE taps. In FIG. 4, driver 410, comprises FIR logic 430, mode logic 450, a plurality of PAM-2 pre-tap FFE tap drivers 413-414, main tap driver 415, and a plurality of PAM-2 post-tap FFE tap drivers 416-417. FIR logic 430 includes shift register 431 and shift register 432. In the particular embodiment illustrated in FIG. 4, shift register 431 and shift register 432 are an arbitrary number of elements deep. Shift register 431 and shift register 432 are illustrated with N number of pre-tap data values ($D_{+N}$ to $D_{+1}$), a primary data value $D_0$, and M number of post-tap data values ($D_{-1}$ to $D_{-M}$.)

Shift register 431 receives a data value D[0] that is to be transmitted in PAM-4 mode. Shift register 432 receives a data value D[1] to be transmitted by driver 410 in both PAM-2 and PAM-4 modes. In PAM-4 mode, D[1] is the most significant bit and D[0] is the least significant bit of the two-bit value to be transmitted by driver 410. In PAM-2 mode, D[1] is the one-bit value to be transmitted by driver 410. Mode logic 450 receives an indicator that configures driver 410 to either drive PAM-2 signals or to drive PAM-4 signals. Driver 410 (and FIR logic 430, in particular) receives at least one timing reference, CK, to indicate and/or control the timing signals internal to, received by, and/or output by, driver 410.

Tap drivers 413-417 are each operatively coupled to mode logic 450. Tap drivers 414-417 are each operatively coupled to mode logic 450 in order to receive values to drive, and to receive tap drive timing. The outputs of tap drivers 413-417 are added together to produce the signal at the output node of driver 410 (OUT). In an embodiment using current mode type tap drivers 413-417 (e.g., open-drain), the outputs of tap drivers 413-417 may be connected together in order to add the outputs of tap drivers 413-417 and produce the signal at the output node of driver 410.

In an embodiment, tap drivers 413-417 each receive tap weights. Tap driver 413 receives tap weight W[+N], the next tap driver (not shown in FIG. 4) receives tap weight W[N−1], and so on, to tap driver 414 which receives tap weight W[+1], tap. Tap driver 315 receives tap weight W[0]. Tap driver 416 receives tap weight W[−1], the next tap driver (not shown in FIG. 4) receives tap weight W[−2], and so on, to tap driver 417 which receives tap weight W[−M]. Each tap weight is supplied to a respective tap driver 413-417 to control the level of the output signal generated by the respective tap driver 413-417.

In PAM-2 mode and PAM-4 mode, shift register 432 is used to store pre-tap data values $D_{+N}$ through $D_{+1}$, a primary data value $D_0$, and post-tap data values $D_{-1}$ through $D_{-M}$. In PAM-2 mode, the primary data value is the data value to be transmitted during a given transmit interval. In PAM-4 mode, the primary data value of shift register 432 is the most significant bit of the two-bit data value to be transmitted during a given transmit interval. The subscript of the "D" elements of shift register 432 indicates the number of transmit intervals that are to transpire before the data value stored in that element will be transmitted. In PAM-2 mode, data value D[0], and therefore shift register 431, is not used In PAM-4 mode, shift register 431 is used to store pre-tap data values $D_{+N}$ through $D_{+1}$, a primary data value $D_0$, and post-tap data values $D_{-1}$ through $D_{-M}$. The primary data value of shift register 431 is the least significant bit of the two-bit data value to be transmitted during a given transmit interval. The subscript of the "D" elements of shift register 431 indicates the number of transmit intervals that are to transpire before the data value stored in that element will be transmitted.

In PAM-2 mode, mode logic 450 configures driver 410 to drive PAM-2 signal levels. Accordingly, in PAM-2 mode, tap drivers 413-414 function as pre-tap drivers (i.e., tap drivers 413-414 apply pre-tap FFE); tap driver 315 functions as the primary (or main) tap driver; and, tap drivers 416-417 function as a post-tap drivers (i.e., tap drivers 416-417 apply post-tap FFE.)

In PAM-4 mode, mode logic 450 configures driver 410 to drive PAM-2 signal levels. In PAM-4 mode, one or more of tap drivers 413-414 and/or tap drivers 416-417 function as part of the primary (or main) tap driver. The remaining tap drivers 413-414, and/or tap drivers 416-417, can be configured to be disabled, function as a pre-tap driver (i.e., apply pre-tap FFE), or function as a post-tap driver (i.e., apply post-tap FFE.) In addition, in an embodiment, for higher order PAM modes (e.g., PAM-Q where Q is an integer greater than 4), an appropriate number (e.g., 3 for PAM-8) of tap drivers 413-414, and/or tap drivers 416-417, can be configured to function as part of the primary (or main) tap driver with the remaining tap drivers disabled or at least one of the remaining tap drivers configured to function as a pre-tap driver, or function as a post-tap driver.

Figure 5:
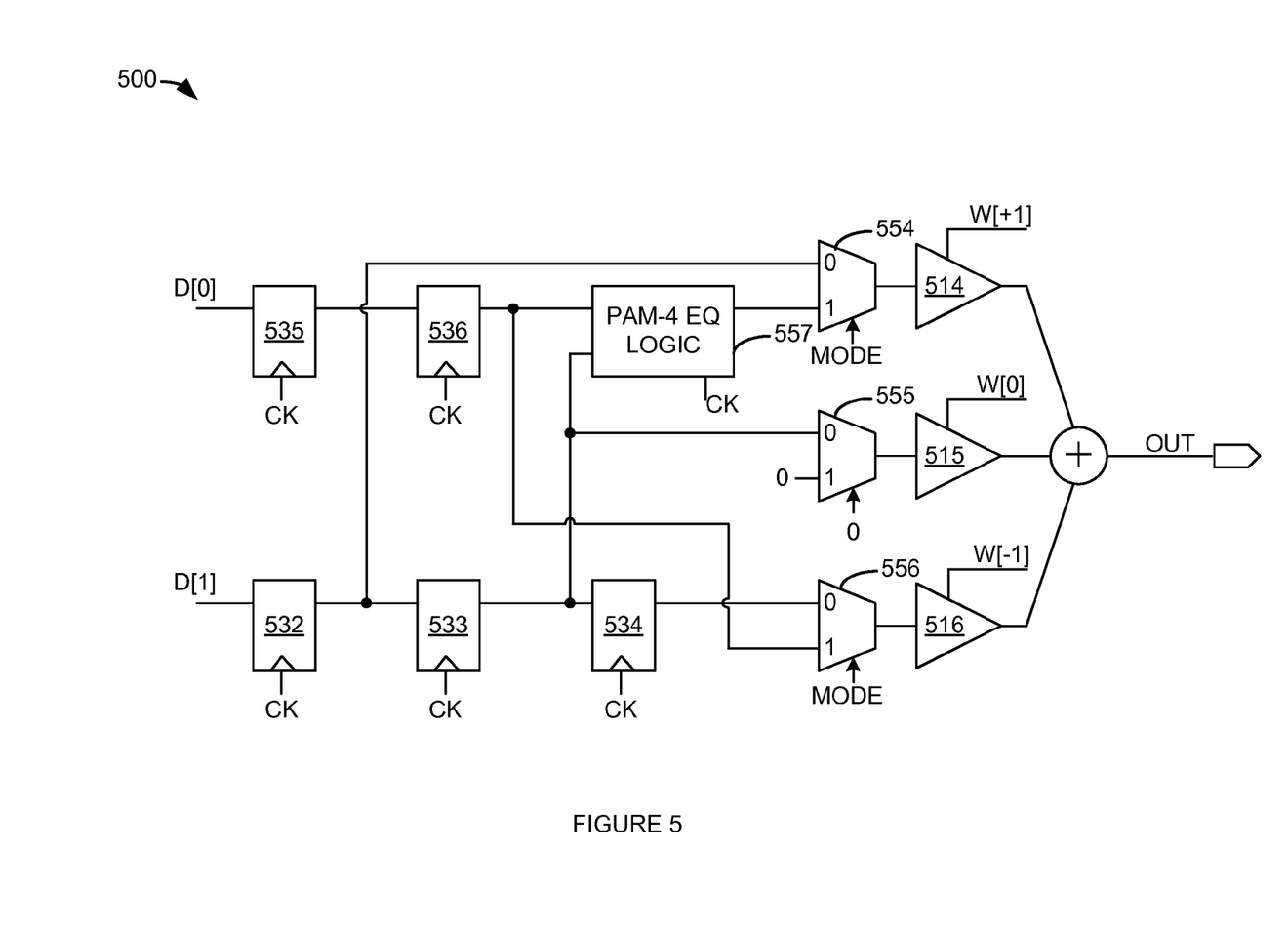
FIG. 5 illustrates an embodiment of a multi-signaling mode driver.

FIG. 5 illustrates an embodiment of a multi-signaling mode driver. In FIG. 5, driver 500 comprises tap driver 514, tap driver 515, tap driver 516, latch 532, latch 533, latch 534, latch 535, latch 536, 2:1 multiplexor (MUX) 554, 2:1 MUX 555, 2:1 MUX 556, and PAM-4 equalization logic 557. A timing reference (CK) is received by PAM-4 equalization logic 557 and at each of the clock inputs of latches 532-534. Latch 532 receives data value D[1]. The output of latch 532 is connected to the input of latch 533 and the "0" input of MUX 554. The output of latch 533 is connected to PAM-4 equalization logic 557, the input of latch 534, and the "0" input of MUX 555. The output of latch 534 is connected to the "0" input of MUX 556. It should be understood that the term 'latch' as used herein refers to a clocked data storage element and therefore includes (but is not limited to) the use of flip-flops, master-slave, and transparent latches, as appropriate, for latches 532-536.

Latch 535 receives data value D[0]. The output of latch 535 is connected to the input of latch 536. The output of latch 536 is connected to PAM-4 equalization logic 557 and the "1" input of MUX 556. The output of PAM-4 equalization logic 557 is connected to the "1" input of MUX 554.

The output of MUX 554 is connected to the input of tap driver 514. The output of MUX 555 is connected to the input of tap driver 515. The output of MUX 556 is connected to the input of tap driver 516. The mode indicator signal (MODE) is connected to the control inputs of MUX 554 and MUX 556. The control input of MUX 555 receives a constant logic zero. Thus, MUX 555 always passes the value at its "0" input (from the output of latch 533) to the output of MUX 555 (i.e., the input of tap driver 515.) Tap driver 514 receives tap weight W[+1]. Tap driver 515 receives tap weight W[0]. Tap driver 516 receives tap weight W[−1]. The outputs of tap drivers 514-516 are added together to produce the signal at the output node of driver 500 (OUT). In an embodiment using current mode type tap drivers 514-516 (e.g., open-drain), the outputs of tap drivers 514-516 may be connected together in order to add the outputs of tap drivers 514-516 and produce the signal at the output node of driver 500.

In PAM-2 mode (i.e., MODE=0), tap driver 514 functions to apply pre-tap FFE (i.e., as a pre-tap) and tap driver 516 functions to apply post-tap FFE (i.e., as a post-tap). Tap driver 515 functions as the main tap to provide the primary part of the PAM-2 signal. In PAM-4 mode (i.e., MODE=1), tap driver 516 functions as part of the main tap to provide the least significant bit part of the PAM-4 signal to the output node, OUT. Tap driver 515 functions as part of the main tap to provide the most significant bit part of the PAM-4 signal to the output node, OUT. Tap driver 514 functions to apply post-tap FFE as controlled by PAM-4 equalization logic 557. It should be understood that, in PAM-4 mode, driver 500 is applying 1-bit post-tap FFE (see, e.g., Table 1) to the PAM-4 signal. It should also be understood that the overhead added to a driver 500 in order to have it function in both PAM-2 and PAM-4 modes is latch 535, latch 536, 2:1 multiplexor (MUX) 554, 2:1 MUX 555, 2:1 MUX 556, and PAM-4 equalization logic 557.

Figure 6A:
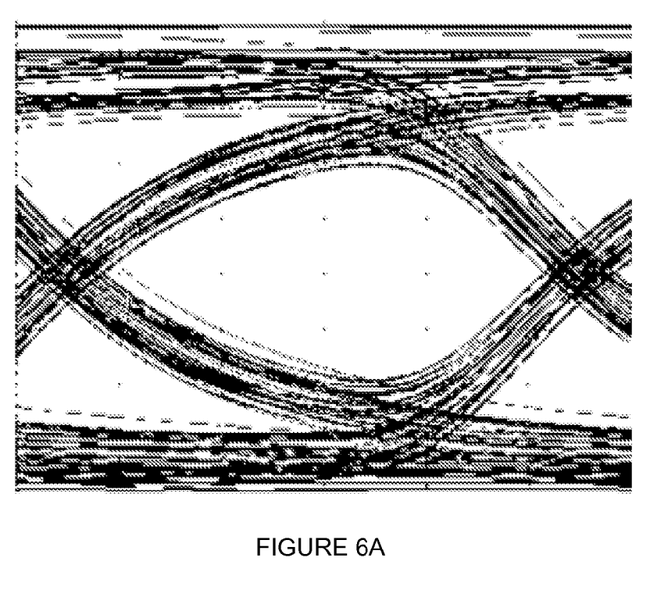
FIG. 6A illustrates a PAM-2 eye pattern without equalization.
Figure 6B:
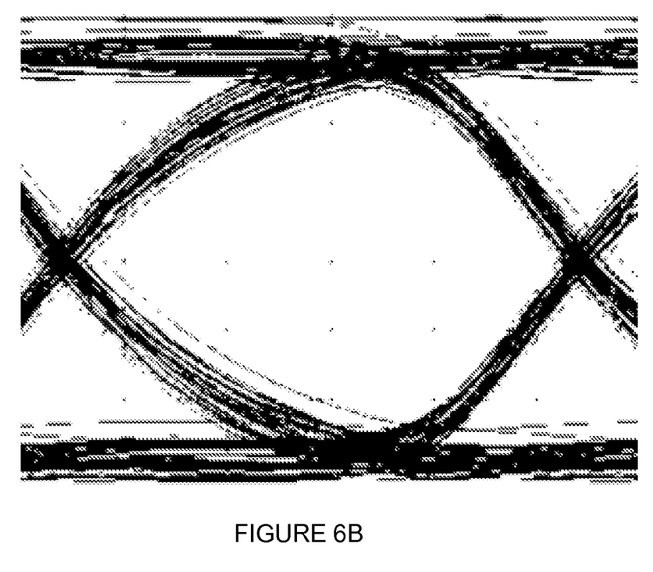
FIG. 6B illustrates a PAM-2 eye pattern with equalization.

FIG. 6A illustrates a PAM-2 eye pattern without equalization. FIG. 6B illustrates a PAM-2 eye pattern with equalization. As is illustrated by comparing FIG. 6A to FIG. 6B, applying equalization (pre-tap and post-tap) improves the characteristics of the PAM-2 eye pattern.

Figure 7A:
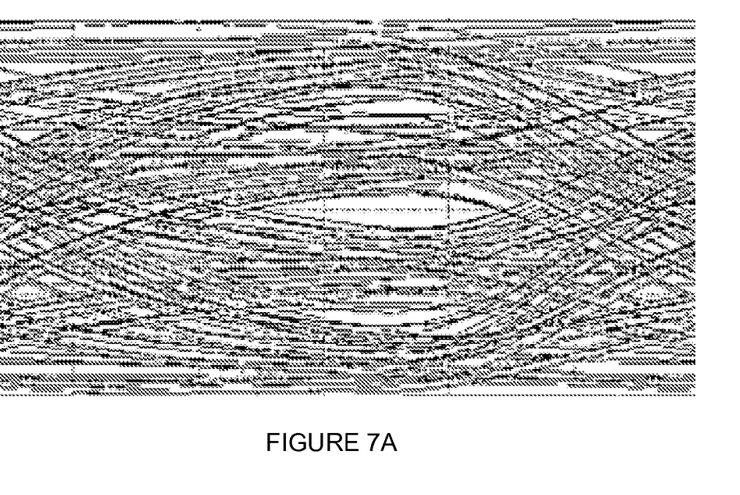
FIG. 7A illustrates a PAM-4 eye pattern without equalization.
Figure 7B:
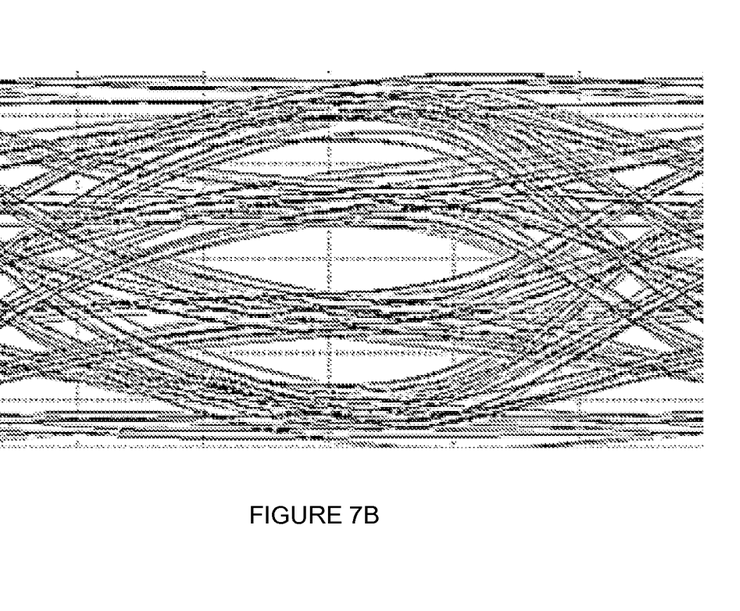
FIG. 7B illustrates a PAM-4 eye pattern with equalization.

FIG. 7A illustrates a PAM-4 eye pattern without equalization. FIG. 7B illustrates a PAM-4 eye pattern with one bit of equalization. As is illustrated by comparing FIG. 7A to FIG. 7B, applying a one bit post-tap FFE equalization improves the characteristics of the PAM-4 eye pattern.

Figure 8:
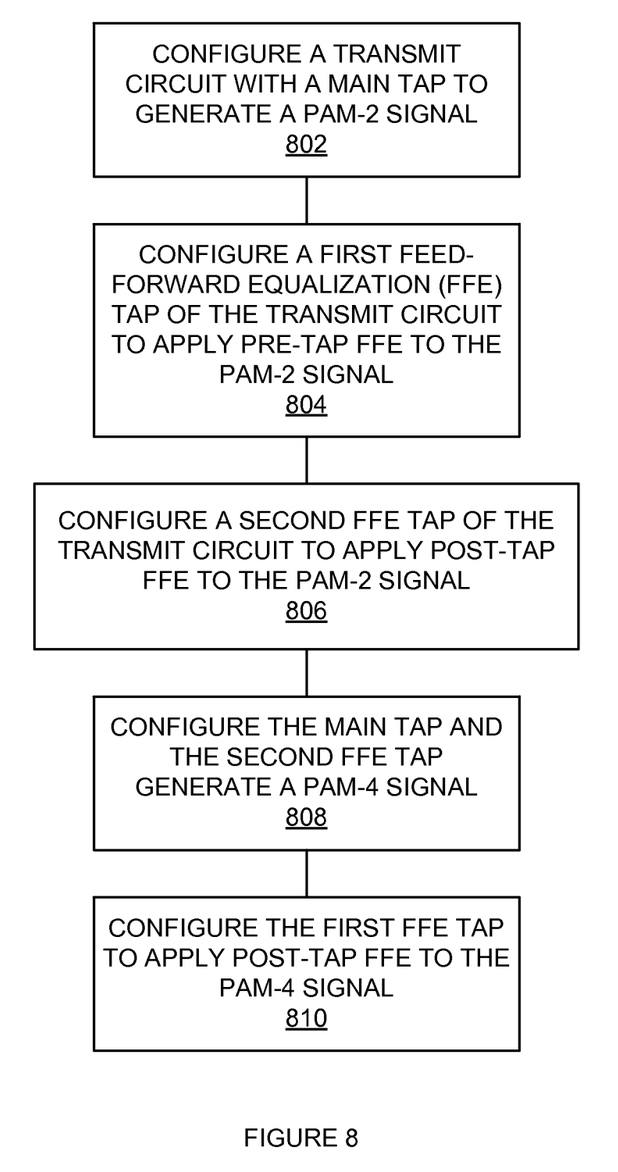
FIG. 8 is a flowchart illustrating a method of configuring a multi-signaling mode driver.

FIG. 8 is a flowchart illustrating a method of configuring a multi-signaling mode driver. The steps illustrated in FIG. 8 may be performed by one or more elements of signaling system 100, memory system 200, driver 310, driver 410, and/or driver 500. A transmit circuit with a main tap is configured to generate a PAM-2 signal (802). For example, driver 310 may be configured to generate a PAM-2 signal (as illustrated in FIG. 3A) using tap driver 315 as a main tap.

A first FFE tap of the transmit circuit is configured to apply pre-tap FFE to the PAM-2 signal (804). For example, tap driver 314 may be configured, by mode logic 350, to apply pre-tap FFE to the primary signal generated by tap driver 315. A second FFE tap of the transmit circuit is configured to apply post-tap FFE to the PAM-2 signal (806). For example, tap driver 316 may be configured, by mode logic 350, to apply post-tap FFE to the primary signal generated by tap driver 315.

The main tap and the second FFE tap are configured to generate a PAM-4 signal (808). For example, mode logic 350 may configure tap driver 315 and tap driver 316 to generate the four signal levels of PAM-4 signaling. Tap driver 315 may generate the portion of the PAM-4 signal associated with most significant bit being transmitted. Tap driver 316 may generate the portion of the PAM-4 signal associated with least significant bit being transmitted.

The first FFE tap is configured to apply post-tap FFE to the PAM-4 signal (810). For example, mode logic 350 may configure tap driver 314 to apply post-tap FFE to the PAM-4 signal generated by the combination of tap driver 315 and tap driver 316.

Figure 9:
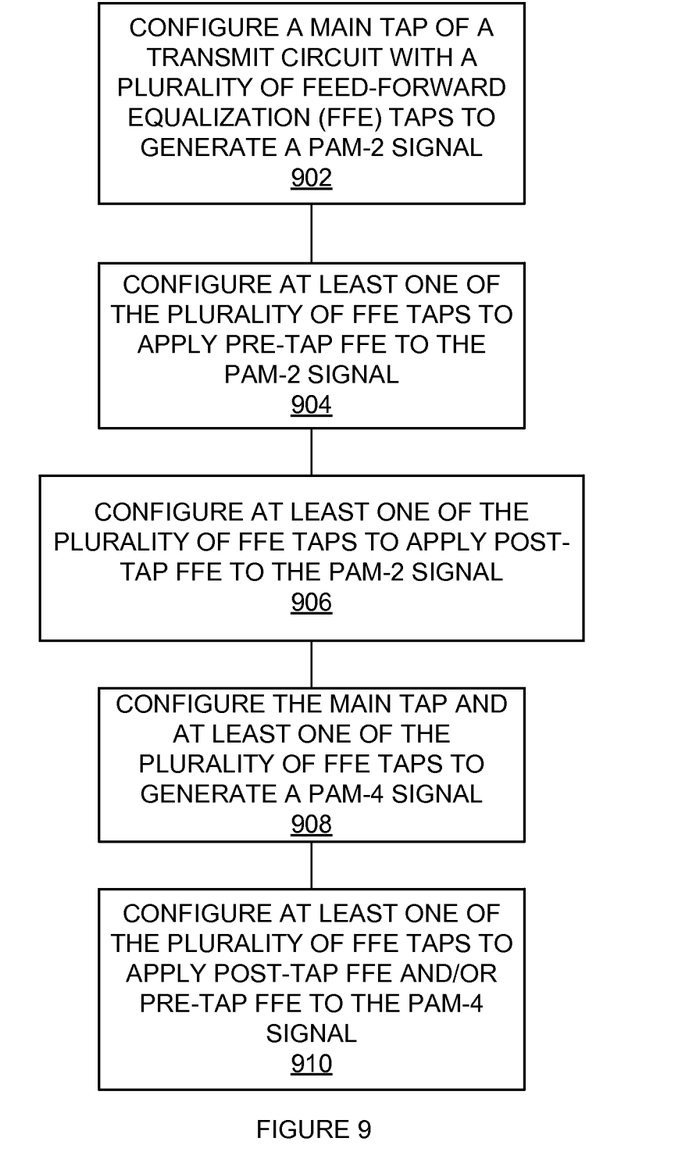
FIG. 9 is a flowchart illustrating a method of applying FFE to different levels of PAM signaling.

FIG. 9 is a flowchart illustrating a method of configuring a multi-signaling mode driver. The steps illustrated in FIG. 9 may be performed by one or more elements of signaling system 100, memory system 200, driver 310, driver 410, and/or driver 500. A main tap of a transmit circuit with a plurality of FFE taps is configured to generate a PAM-2 signal (902). For example, driver 410 (with FFE tap drivers 413-414 and 416-417) may be configured to generate a PAM-2 signal with tap driver 415 functioning as a main tap.

At least one of the plurality of FFE taps is configured to apply pre-tap FFE to the PAM-2 signal (904). For example, one or more of FFE tap drivers 413-414 may be configured by mode logic 450 to apply pre-tap FFE to the PAM-2 signal generated by tap driver 415. At least one of the plurality of FFE taps is configured to apply post-tap FFE to the PAM-2 signal (906). For example, one or more of FFE tap drivers 416-417 may be configured by mode logic 450 to apply post-tap FFE to the PAM-2 signal generated by tap driver 415.

The main tap and at least one of the plurality of FFE taps are configured to generate a PAM-4 signal (908). For example, tap driver 415 and one or more of tap drivers 416-417 may be configured by mode logic 450 to generate the signal levels for PAM-4 signaling. At least one of the plurality of FFE taps are configured to apply post-tap FFE and/or pre-tap FFE to the PAM-4 signal. For example, one or more of tap drivers 413-414 and any remaining tap drivers 416-417 may be configured to apply post-tap FFE and/or pre-tap FFE to the PAM-4 signal.

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of signaling system 100, memory system 200, driver 310, driver 410, and/or driver 500, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 8 mm magnetic tape, 3½ inch floppy media, CDs, DVDs, and so on.

Figure 10:
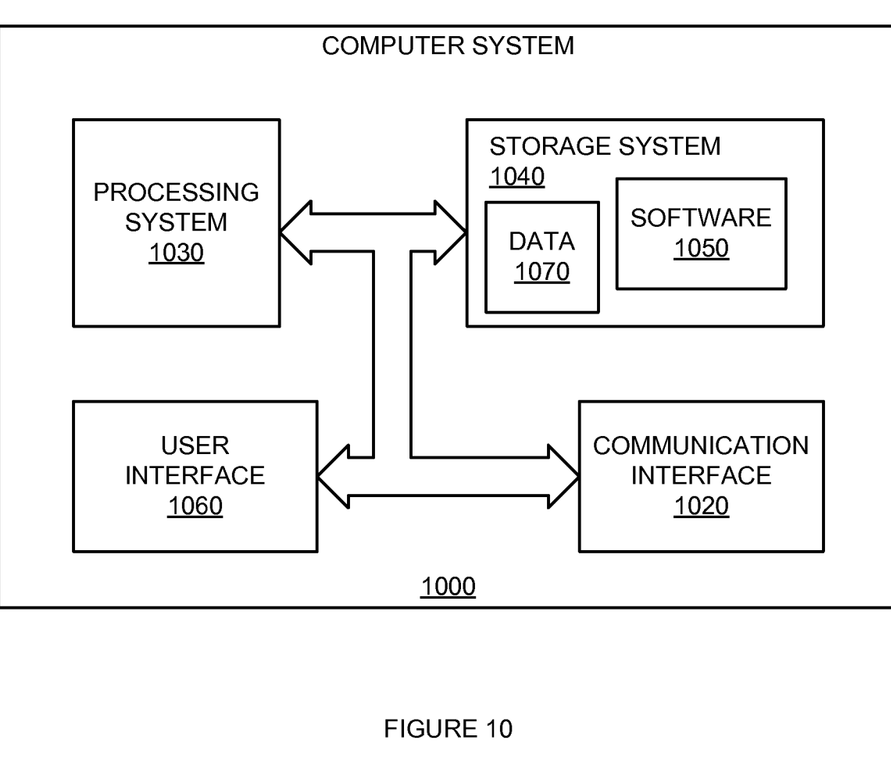
FIG. 10 is a block diagram of a computer system.

FIG. 10 illustrates a block diagram of a computer system. Computer system 1000 includes communication interface 1020, processing system 1030, storage system 1040, and user interface 1060. Processing system 1030 is operatively coupled to storage system 1040. Storage system 1040 stores software 1050 and data 1070. Processing system 1030 is operatively coupled to communication interface 1020 and user interface 1060. Computer system 1000 may comprise a programmed general-purpose computer. Computer system 1000 may include a microprocessor. Computer system 1000 may comprise programmable or special purpose circuitry. Computer system 1000 may be distributed among multiple devices, processors, storage, and/or interfaces that together comprise elements 1020-1070.

Communication interface 1020 may comprise a network interface, modem, port, bus, link, transceiver, or other communication device. Communication interface 1020 may be distributed among multiple communication devices. Processing system 1030 may comprise a microprocessor, microcontroller, logic circuit, or other processing device. Processing system 1030 may be distributed among multiple processing devices. User interface 1060 may comprise a keyboard, mouse, voice recognition interface, microphone and speakers, graphical display, touch screen, or other type of user interface device. User interface 1060 may be distributed among multiple interface devices. Storage system 1040 may comprise a disk, tape, integrated circuit, RAM, ROM, EEPROM, flash memory, network storage, server, or other memory function. Storage system 1040 may include computer readable medium. Storage system 1040 may be distributed among multiple memory devices.

Processing system 1030 retrieves and executes software 1050 from storage system 1040. Processing system 1030 may retrieve and store data 1070. Processing system 1030 may also retrieve and store data via communication interface 1020. Processing system 1050 may create or modify software 1050 or data 1070 to achieve a tangible result. Processing system may control communication interface 1020 or user interface 1060 to achieve a tangible result. Processing system 1030 may retrieve and execute remotely stored software via communication interface 1020.

Software 1050 and remotely stored software may comprise an operating system, utilities, drivers, networking software, and other software typically executed by a computer system. Software 1050 may comprise an application program, applet, firmware, or other form of machine-readable processing instructions typically executed by a computer system. When executed by processing system 1030, software 1050 or remotely stored software may direct computer system 1000 to operate as described herein.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An integrated circuit, comprising:
  a transmit circuit having a multi-tap finite impulse response (FIR) equalizer including at least a main tap and a plurality of feed-forward equalization (FFE) taps; and,
  mode selection circuitry to, in a two level pulse amplitude modulation (PAM-2) mode, configure the main tap to generate a PAM-2 data signal, and to configure at least one of the plurality of FFE taps to apply FFE to the PAM-2 data signal, the mode selection circuitry also to, in a four level pulse amplitude modulation (PAM-4) mode, configure the main tap and at least one of the plurality of FFE taps to combine to generate a main PAM-4 data signal, the mode selection circuitry also to, in the four level pulse amplitude modulation (PAM-4) mode, configure the at least one of the plurality of FFE taps to not apply FFE to the main PAM-4 data signal.

2. The integrated circuit of claim 1, wherein the mode selection circuitry is also to, in said PAM-4 mode, configure at least one of the plurality of FFE taps to apply post-tap FFE to said PAM-4 data signal.

3. The integrated circuit of claim 2, wherein said plurality of FFE taps comprises a first tap and a second tap, the first tap, in the PAM-2 mode, is to be configured to apply pre-tap FFE to the PAM-2 data signal.

4. The integrated circuit of claim 3, wherein the first tap, in the PAM-4 mode, is to be configured to apply post-tap FFE to the PAM-4 data signal.

5. The integrated circuit of claim 3, wherein the second tap, in the PAM-2 mode, is to be configured to apply post-tap FFE to the PAM-2 data signal.

6. The integrated circuit of claim 5, wherein, in the PAM-4 mode, the main tap is to be configured to drive a most significant bit of the PAM-4 data signal and the second tap is to be configured to drive a least significant bit of the PAM-4 data signal.

7. The integrated circuit of claim 2, wherein said plurality of FFE taps comprises a first tap and a second tap, wherein, in the PAM-2 mode, the first tap is to be configured to apply pre-tap FFE to the PAM-2 data signal and the second tap is to be configured to apply post-tap FFE to the PAM-2 data signal.

8. The integrated circuit of claim 2, wherein said plurality of FFE taps comprises a first tap and a plurality of taps, wherein, in the PAM-2 mode, the first tap is to be configured to apply post-tap FFE to the PAM-2 data signal and the plurality of taps is to be configured to apply pre-tap FFE to the PAM-2 data signal.

9. A transmitter that is selectively reconfigurable, comprising:
a main tap to drive a two level pulse amplitude modulation (PAM-2) signal;
a first at least one tap to apply pre-tap feed-forward equalization (FFE) to said PAM-2 signal in a first selectable configuration of the transmitter; and,
a second at least one tap to apply post-tap FFE to said PAM-2 signal in said first selectable configuration of the transmitter, at least one of said first at least one tap and said second at least one tap are reconfigurable in a second selectable configuration of the transmitter to drive a first bit of a four level pulse amplitude modulation (PAM-4) signal.

10. The transmitter of claim 9, wherein said second at least one tap is reconfigured in said second selectable configuration of the transmitter to drive said first bit said PAM-4 signal.

11. The transmitter of claim 10, wherein said first bit of said PAM-4 signal is a least significant bit.

12. The transmitter of claim 11, wherein said main tap is to drive a most significant bit of said PAM-4 signal in said second selectable configuration of the transmitter.

13. The transmitter of claim 9, wherein said first at least one tap is reconfigured in said second selectable configuration of the transmitter to drive said first bit said PAM-4 signal.

14. The transmitter of claim 13, wherein said first bit of said PAM-4 signal is a least significant bit.

15. The transmitter of claim 14, wherein said main tap is to drive a most significant bit of said PAM-4 signal in said second selectable configuration of the transmitter.

16. An integrated circuit, comprising:
a selectively reconfigurable transmitter for selectively driving, with feed-forward equalization (FFE), one of a PAM-2 and a PAM-4 signal, comprising:
a main tap to drive a PAM-2 signal in a first configuration and a first bit of a PAM-4 signal in a second configuration; and,
a plurality of taps to apply pre-tap FFE and post-tap FFE in said first configuration and to drive a second bit of said PAM-4 signal in said second configuration.

17. The integrated circuit of claim 16, wherein said plurality of taps comprises a first set of taps and a second set of taps, said first set of taps to apply said pre-tap FFE in said first configuration and said second set of taps to apply said post-tap FFE in said first configuration.

18. The integrated circuit of claim 17, wherein said first set of taps apply post-tap FFE in said second configuration.

19. The integrated circuit of claim 17, wherein said second set of taps to drive said second bit of said PAM-4 signal in said second configuration.

20. The integrated circuit of claim 16, wherein said plurality of taps comprises a first set of taps and a second set of taps, said first set of taps to apply said pre-tap FFE in said first configuration and said second set of taps to apply said post-tap FFE in said first configuration, said first set of taps apply post-tap FFE in said second configuration, said second set of taps to drive said second bit of said PAM-4 signal in said second configuration.

* * * * *